__United States Patent Office__

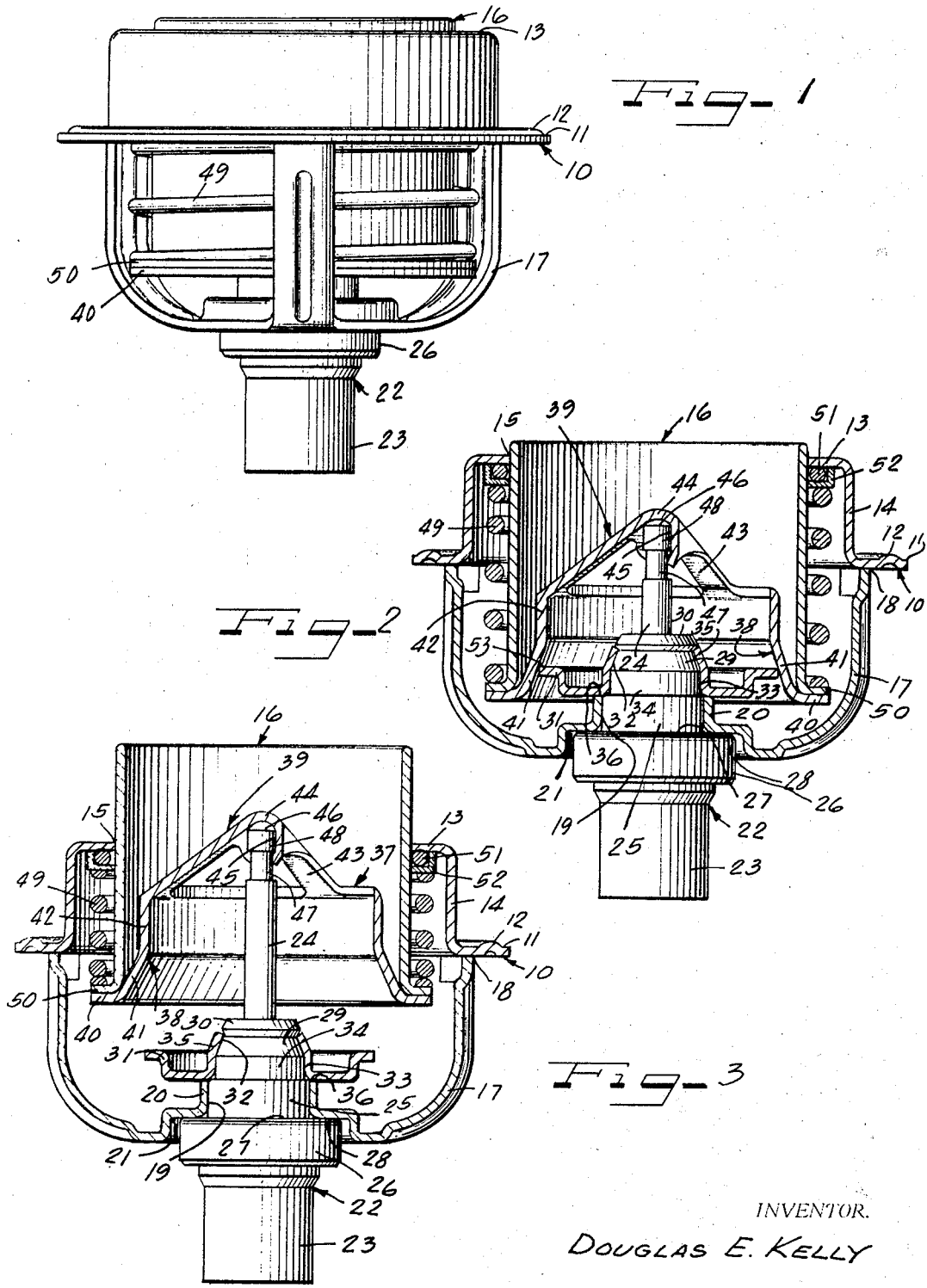

3,448,921
Patented June 10, 1969

3,448,921
UNBALANCED SLEEVE THERMOSTAT
Douglas E. Kelly, Northfield, Ill., assignor to The Dole Valve Company, Morton Grove, Ill., a corporation of Illinois
Filed Dec. 8, 1966, Ser. No. 600,096
Int. Cl. F01p 7/16
U.S. Cl. 236—34                                6 Claims

ABSTRACT OF THE DISCLOSURE

A waterline thermostat with a transverse wall piece having a peripheral edge thereof fitted within a conduit and having a portion thereof disposed downstream of the peripheral edge to guide a sleeve member which is actuated in response to a thermal power unit fixedly positioned within a base wall of the thermostat. The sleeve member has an internal stirrup, a portion of which is a downstream converging throat. The power member of the thermal power unit is rockably mounted within the stirrup, and the movable sleeve member is biased into a closed position with a fixed poppet-type valve head by a coil spring which is properly orientated to simultaneously bias the sleeve member into a closed position and to seat a ring seal against the upstream surface of the transverse wall piece.

BACKGROUND OF THE INVENTION

Field of the invention

The field of art to which this invention pertains is a thermostat, particularly a waterline thermostat which may be disposed within the conduit of a cooling system of a vehicle to control the flow of fluid through the engine in response to the temperature of the fluid.

Summary

An important feature of this invention is the provision of a thermostat of the unbalanced sleeve type for controlling the circulation of fluid through a cooling system.

Another feature of the invention is the provision of a thermostat having a thermal sensitive power unit for operating a sleeve-type unbalanced valve wherein the casing of the power unit is fixedly attached to a base wall of the thermostat and wherein the power member is relatively extensible from the casing to operate the sleeve-type valve member.

An object of the invention is the provision of a thermostat having a fixed poppet valve head and a movable sleeve member wherein the sleeve member is of a larger diameter than the poppet-type valve head.

Another object of the present invention is the provision for a thermostat having means for supporting a movable sleeve member externally of the sleeve and having a power member affixed to the sleeve at an internally formed stirrup.

It is an additional object of this invention to provide an internal stirrup for an axially movable sleeve member of a waterline type thermostat wherein the internal stirrup has a smoothly curved and converging throat portion for controlling the flow of fluid through the valve.

It is also an object of this invention to provide a novel means for mounting a seal member about an axially movable sleeve of a waterline-type thermostat wherein the sleeve is biased closed and the seal member is operably disposed between the movable sleeve and the stationary valve wall by a single biasing means.

Other and further objects of this invention will be apparent to those skilled in this art from the following detailed description and the annexed sheets of drawings which show several embodiments of the invention.

Brief description of the drawing

FIGURE 1 is an illustrative side view of a thermostat in accordance with the present invention;

FIGURE 2 is a sectional view of the thermostat of FIGURE 1 showing the axially movable sleeve member in a closed position relative to the fixed poppet valve head, and FIGURE 3 is a sectional view similar to FIGURE 2 showing the thermal power unit in an energized position and showing the axially movable sleeve member in an opened position relative to the fixed valve head.

Description of the preferred embodiment

The thermostat according to this invention is provided with a transverse wall piece having a peripheral edge 11 which may be fitted within a conduit of a fluid cooling system of a combustion-type engine or the like. The edge 11 is provided with a raised bead-like portion 12 to aid in sealing the thermostat within the conduit.

The transverse wall piece 10 has a portion 13 which is disposed downstream of the edge 11 and a connecting cylindrical wall portion 14.

The downstream portion 13 of the transverse wall piece 10 has a central or guide opening 15 formed therein. A sleeve member 16 is slidably positioned within the guide opening 15 for being slidably actuated in response to changes in fluid temperature conditions.

In addition to the transverse wall piece 10, the thermostat of this invention has a base wall piece 17 which is rigidly and permanently affixed to the transverse wall piece 10 at points 18 and the like. The base wall 17 has a support opening 19 formed therein. The support opening 19 has a guide wall 20 and a recessed region 21 for receiving and supporting a thermal power unit 22 therein.

The thermal power unit 22 has a casing 23 and a relatively extensible power member 24. As is well understood in the art, the casing 23 is filled with a thermally expansible wax or similar substance, and a resilient diaphragm or similar member is disposed between the wax and the relatively extensible power member 24. Upon a rise in temperature ambient the casing 23, the wax is caused to expand and to compress the diaphragm or similar member within the casing to cause the power member 24 to extend outwardly from the casing. In the present invention it is the extension of the power member from the casing that is used to actuate the sleeve 16 and hence to control the flow of fluid through the valve.

The thermal power unit 22 is fitted within the support opening 19 such that a cylindrical wall portion 24 fits snugly at the interior surface of the cylindrical wall 20. In addition, a collar 25 which is formed about the casing 23 is disposed partially within the recess 21 with the upper surface 27 of the collar 26 contacting the lower surface 28 of the base wall 17.

The thermal power unit 22 is disposed within the valve of the present invention in such a way that the casing 23 of that unit is fixed relative to the base wall 17, and the power member 24 is allowed to move relative to the casing and base wall.

To rigidly fixed the casing 22 within the base wall 17, the casing 23 is provided with a tapered wall portion 29 and an adjacent bead 30. The bead 30 is formed at the downstream end of the casing and provides a means for locking the casing within the base wall 17.

The locking function is accomplished by providing a circular-type valve member 31 which has a center opening 32 and which has a cylindrical wall portion 33. The circular valve member 31 is positioned about the upper portion of the casing 23 such that the cylindrical wall portion 33 fits about a similarly formed wall portion 34 of the casing 23. The upper edges 35 of the cylindrical wall portion 33 are crimped as shown so as to be lockably positioned between the bead 30 and the upper edge 36 of the cylindrical portion 20 of the base wall 17.

As is apparent from FIGURES 2 and 3, the circular valve member 31 operates not only to lockably secure the casing within the base wall 17, but also to function as a valve head to control the flow of fluid through the system.

To cooperate with the circular valve head 31, the axially movable sleeve 16 is provided with a stirrup portion 37 which is rigidly affixed internally of the sleeve 16. The stirrup 37 comprises a smooth throat portion 38 and an open port portion 39. The smooth throat portion 38 is rigidly affixed to the sleeve 16 at points 40. The throat portion itself consists of a frusto-conical wall portion 41 and a cylindrical wall portion 42. The cylindrical wall portion 42 is disposed just downstream of the frusto-conical wall portion 41 and just upstream of the open port section 39. The open port section 39 comprises a plurality of struts 43 extending from the cylindrical wall portion 42 to an apex 44 formed centrally of the stirrup 37.

The apex 44 of the stirrup 37 is provided with a socket portion 45 for rockably receiving the downstream end 46 of the relatively extensible power member 24. For this purpose, the downstream end of the power member 24 is provided with a rcess 47 to form a ball-like structure 48 which is rockably received within the socket 45.

When the power member 24 is fully retracted within the casing 23, as shown in FIGURE 2, the circular valve member 31 engages the frusto-conical wall portion 41 of the stirrup 37 to close off the flow of fluid through the valve. As is shown in FIGURE 1, the base wall portion 17 of the valve is opened such that fluid from the connected conduit will flow through the base wall portion and through the sleeve member 16, when the sleeve 16 is elevated from a contacting position with the valve member 31 as is shown in FIGURE 3.

When the temperature of fluid within the cooling system rises, the power member 24 extends relatively from the casing 23, and the sleeve 16 is lifted as shown in FIGURE 3. However, when the temperature of the fluid falls, the power member 24 and the sleeve 16 must be returned to a retracted position by a biasing member which in this embodiment is a coil spring 49 disposed about the outside surface of the sleeve 16. The sleeve 16 has an out-turned lip portion 50 for receiving the base of the spring 49.

To assure that fluid which is allowed to pass through the base wall portion 17 does not pass through the guide opening 15 externally of the sleeve 16, a seal ring 51 is disposed about the sleeve 16 and against the upstream surface of the wall portion 13 of the transverse wall piece 10. A spring-seating ring 52 is provided about the seal ring 51 and is utilized to seat the spring 49.

Therefore, the spring 49 is seated both at the out-turned lip 50 of the sleeve 16 and at the lower surface of the ring 52. Hence, the coil spring 49 not only biases the sleeve 16 and the power member 24 into a closed position with the valve 31, but also acts to seat the seal ring 51 against the exterior of the sleeve 16 and against the upstream surface of the wall portion 13.

As shown in FIGURE 2, a fine line contact 53 is provided between the peripheral edge of the circular valve member 31 and the frusto-conical wall portion of the stirrup 37. This fine line contact is achieved by forming the peripheral edge of the member 31 at a substantial angle to the closed position of the frusto-conical wall portion 41. In this way, dirt and other foreign particles are not trapped between the contacting valve surfaces which could otherwise prevent the valve from properly seating. The valve of this invention seats tightly due to the rigid positioning of the casing and due to the frusto-conical configuration of the smooth throat portion 38 of the stirrup 37.

Also, as shown in FIGURE 2, the sleeve 16 is guided accurately into a properly seated position with the circular valve member 31 by the guide opening 15 which contacts the sleeve at the downstream edge thereof, and by the power member 24 which engages the internal stirrup of the sleeve. It will be noted that as the sleeve moves into a retracted position as shown in FIGURE 2, the engagement point of the power member 24 with the stirrup 37 is displaced axially relative to the engagement of the guide opening 15 at the exterior surface of the sleeve 16. In this way, an improved guiding function is obtained and increased stability is accomplished for the valve operation.

It will be understood that various modifications and combinations of the features of my invention may be accomplished by those skilled in the art, but I desire to claim all such modifications and combinations as properly come within the scope and spirit of my invention.

I claim:
1. An unbalanced sleeve thermostat comprising:
   a transverse wall piece having a peripheral lip for supporting the thermostat in a conduit, and having a guide portion extending in a downstream direction from said peripheral lip,
   said guide portion having a guide opening formed centrally thereof,
   a base wall portion extending upstream from said transverse wall portion and having a support opening formed centrally thereof,
   a thermal sensitive power unit having a casing and a relatively extensible power member operably disposed within the casing,
   said power member being extended from said casing upon a rise in temperature ambient said casing,
   said casing being fixedly positioned within said support opening and having said power member extended toward said guide opening,
   a sleeve member guided for axial movement within said guide opening,
   a stirrup member having an apex portion and a side wall portion extending from said apex portion,
   said side wall portion being fixedly attached to the upstream end of said sleeve member,
   said sleeve member being guided by said guide opening at the downstream end thereof,
   said power member having its downstream end secured substantially at the center of said apex portion of said stirrup,
   a valve member fixedly secured to said casing and being engageable with the inner surface of said stirrup member for closing said valve, and
   means biasing said sleeve member in an upstream direction and into engagement with said valve member.

2. An unbalanced sleeve thermostat in accordance with claim 1 wherein said stirrup comprises a substantially smooth throat portion converging in a downstream direction from the upstream edge of said sleeve member and an open port portion formed immediately downstream of said throat portion.

3. An unbalanced sleeve thermostat in accordance with claim 2 wherein said open port portion of the stirrup has an apex formed substantially centrally thereof and wherein said power member is rockably received within said apex portion.

4. An unbalanced sleeve thermostat in accordance with claim 2 wherein said smooth throat portion comprises a frusto-conical wall portion formed adjacent to the upstream edge of said sleeve and a cylindrical wall portion formed immediately downstream of said frusto-conical wall portion and wherein said valve member comprises a substantially circular member disposed transversely of the thermostat and having a peripheral edge formed at a substantial angle to the contacting surface of the frusto-conical wall portion when the power member is fully retracted.

5. An unbalanced sleeve thermostat in accordance with claim 1 wherein a seal member is disposed about said guide opening externally of said sleeve and against the upstream surface of said guide portion, wherein said sleeve has an out-turned lip at the upstream edge thereof, and wherein a coil spring is disposed about said sleeve and between said lip and said seal member for biasing said sleeve into engagement with said valve member and for sealing said sleeve to said guide portion.

6. An unbalanced sleeve thermostat comprising:
a transverse wall piece having a peripheral lip for supporting the thermostat in a conduit, and having a guide portion extending in a downstream direction from said peripheral lip,
said guide portion having a guide opening formed centrally thereof,
a base wall portion extending upstream from said transverse wall portion and having a support opening formed centrally thereof,
a thermal sensitive power unit having a casing and a relatively extensible power member operably disposed within the casing,
said power member being extended from said casing upon a rise in temperature ambient said casing,
said casing being fixedly positioned within said support opening and having said power member extended toward said guide opening,
said sleeve member being guided by said guide opening at the downstream end thereof,
a stirrup member having a frusto-conical wall portion formed adjacent to the upstream edge of said sleeve, a cylindrical wall portion formed immediately downstream of said frusto-conical wall portion, an open port portion formed immediately downstream of said cylindrical wall portion and terminating in an apex,
said power member having its downstream end rockably secured within said apex at a point upstream of said guide opening when said power member is fully retracted into said casing,
said cylindrical wall portion of said stirrup being fixedly secured to the upstream end of said sleeve member and said apex portion extending downstream of the point of attachment of said sleeve member with said cylindrical wall portion of said stirrup,
a circular valve member fixedly secured to said casing and having a relatively fine line edge engageable with the inner surface of said stirrup member for closing said valve,
a seal member disposed about said guide opening externally of said sleeve and against the upstream surface of said guide portion,
said sleeve having an out-turned lip at the upstream edge thereof, and
a coil spring disposed about said sleeve between said lip and said seal member.

References Cited
UNITED STATES PATENTS

| | | | |
|---|---|---|---|
| 2,754,062 | 7/1956 | Von Wangenheim | 236—34.5 |
| 2,810,524 | 10/1957 | Puster | 236—34 |
| 2,829,835 | 4/1958 | Branson | 236—34.5 |
| 2,919,069 | 12/1959 | Freismuth | 236—34 |
| 3,057,556 | 10/1962 | Wagner | 236—34.5 |
| 3,207,437 | 9/1965 | Bailey | 236—34 |

EDWARD J. MICHAEL, *Primary Examiner.*